US011314226B2

United States Patent
Jounishi et al.

(10) Patent No.: US 11,314,226 B2
(45) Date of Patent: Apr. 26, 2022

(54) APPLICATION EXECUTION CONTROL SYSTEM

(71) Applicant: FANUC CORPORATION, Yamanashi (JP)

(72) Inventors: Rika Jounishi, Yamanashi (JP); Toshinori Matsukawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 12 days.

(21) Appl. No.: 16/983,275

(22) Filed: Aug. 3, 2020

(65) Prior Publication Data

US 2021/0041850 A1  Feb. 11, 2021

(30) Foreign Application Priority Data

Aug. 5, 2019 (JP) .............................. JP2019-143558

(51) Int. Cl.
*G05B 19/408* (2006.01)
*G06F 9/44* (2018.01)
(Continued)

(52) U.S. Cl.
CPC .............. *G05B 19/408* (2013.01); *G06F 9/44* (2013.01); *G06F 9/54* (2013.01); *G06F 16/17* (2019.01)

(58) Field of Classification Search
CPC ...... G06F 16/17; G06F 11/3055; G06F 91/54; G06F 9/44; G06F 2201/865; G05B 19/408; G05B 19/4155; G05B 2219/32026
See application file for complete search history.

(56) References Cited

U.S. PATENT DOCUMENTS

2005/0198355 A1*  9/2005  Kawada ............. H04N 21/6118
                                                   709/232
2007/0086345 A1*  4/2007  Yashima ................. H04L 43/00
                                                   370/236
(Continued)

FOREIGN PATENT DOCUMENTS

JP  2011-140076 A   7/2011
JP  2013-251651 A  12/2013

*Primary Examiner* — Tuan C Dao
(74) *Attorney, Agent, or Firm* — Studebaker & Brackett PC (57) ABSTRACT

An object is to provide an application execution control system which can reduce a burden on an application and the number of development steps. An application execution control system includes: a definition file storage unit which stores a definition file that defines instruction information which is transmitted according to the information and the state of a controller; a definition file acquisition unit; a definition file analysis unit which analyzes the acquired definition file; a condition production unit which produces, based on the result of the analysis, a determination condition of the information and the state of the controller; a condition storage unit which stores the produced determination condition; a condition determination unit which performs a condition determination from various types of information of the controller based on the determination condition; and an instruction information transmission unit which transmits the instruction information defined with the definition file when the condition determination is performed and the information of the controller agrees with the determination condition, and the application execution device executes processing with the instruction information transmitted from the instruction information transmission unit.

2 Claims, 5 Drawing Sheets

(51) Int. Cl.
*G06F 9/54* (2006.01)
*G06F 16/17* (2019.01)

(56) References Cited

U.S. PATENT DOCUMENTS

| | | | | |
|---|---|---|---|---|
| 2007/0101178 | A1* | 5/2007 | Jammu | G05B 23/0278 |
| | | | | 714/4.4 |
| 2007/0101365 | A1* | 5/2007 | Clark | G07F 9/002 |
| | | | | 725/38 |
| 2008/0201617 | A1* | 8/2008 | Ohara | H04N 1/00795 |
| | | | | 709/201 |
| 2009/0313621 | A1* | 12/2009 | Dewa | G11B 20/00427 |
| | | | | 718/1 |
| 2010/0265848 | A1* | 10/2010 | Kummetz | H04W 4/021 |
| | | | | 370/255 |
| 2011/0032566 | A1* | 2/2011 | Sato | H04N 1/00222 |
| | | | | 358/1.15 |
| 2018/0033092 | A1* | 2/2018 | Wang | G06Q 40/123 |

* cited by examiner

APPLICATION EXECUTION CONTROL SYSTEM

This application is based on and claims the benefit of priority from Japanese Patent Application No. 2019-143558, filed on 5 Aug. 2019, the content of which is incorporated herein by reference.

BACKGROUND OF THE INVENTION

Field of the Invention

The present invention relates to an application execution control system.

Related Art

As is known, for example, in the field of machine work, CNC (computer numerical controller: Computerized Numerical Control) technology is applied, the amount of movement of a tool, the speed of the movement thereof and the like are numerically controlled with a computer, and thus the repetition of the same machining procedure, the machining of a complicated shape and the like are highly automated (see, for example, patent documents 1 and 2).

On the other hand, for example, in a case where a CNC is used to control the drive of an industrial machine, when an application designer wants to make a produced application and the CNC cooperate with each other, it is often necessary to acquire the state and the information of the CNC.

Specifically, when the application designer wants to switch the details of a display in the application according to the state and the information of the CNC, for example, operations proceed in the order of (1): the acquisition of the state and the information of the CNC and (2): the determination of the details of the display according to (1).

Patent Document 1: Japanese Unexamined Patent Application, Publication No. 2013-251651

Patent Document 2: Japanese Unexamined Patent Application, Publication No. 2011-140076

SUMMARY OF THE INVENTION

Here, all the order and the mechanism of the operations such as (1) and (2) described above need to be prepared on the application side.

However, in order to continue to cooperate with the CNC, the application needs to continue to periodically acquire and analyze the state and the information of the CNC, and thus a burden on the application side is significantly increased.

Since the mechanism of the acquisition and the analysis of the information of the CNC is present on the application side, even when applications utilize the same information, the designs thereof may naturally differ depending on each application design engineer, with the result that a variation in the quality (such as the maintainability and efficiency of the application itself) may be produced.

Hence, it is highly desired to develop a method of reducing a burden on the application side so as to be able to reliably remove a variation in the quality caused by differences in design.

One aspect of an application execution control system in the present disclosure is a system which includes a controller that transmits operation instruction information in concert with an internal state to an application execution device, and includes: a definition file storage unit which stores a definition file that defines the instruction information which is transmitted according to the information and the state of the controller; a definition file acquisition unit which acquires the definition file; a definition file analysis unit which analyzes the acquired definition file; a condition production unit which produces, based on the result of the analysis, a determination condition of the information and the state of the controller; a condition storage unit which stores the determination condition produced with the condition production unit; a condition determination unit which performs a condition determination from various types of information of the controller based on the determination condition; and an instruction information transmission unit which transmits the instruction information defined with the definition file when the condition determination is performed and the information of the controller agrees with the determination condition, and the application execution device executes processing with the instruction information transmitted from the instruction information transmission unit.

According to the one aspect of the application execution control system in the present disclosure, without all the information of the controller such as a CNC requiring an application being monitored, only the processing is performed in response to the issued instruction information, and thus it is possible to cooperate with the controller such as a CNC. In this way, it is possible to reduce a burden on the application and the number of development steps.

The determination condition and the instruction information are previously prepared, and thus designs on the application side can be integrated (standardized), with the result that it is possible to remove a disadvantage in which a variation in the quality is produced as conventionally done.

DETAILED DESCRIPTION OF THE INVENTION

An application execution control system according to as embodiment will be described below with reference to FIGS. 1 to 5. Here, in the present embodiment, the description will be given with the assumption that the application execution control system is a control system using a CNC such as a machine tool of an industrial machine.

Figure 1:
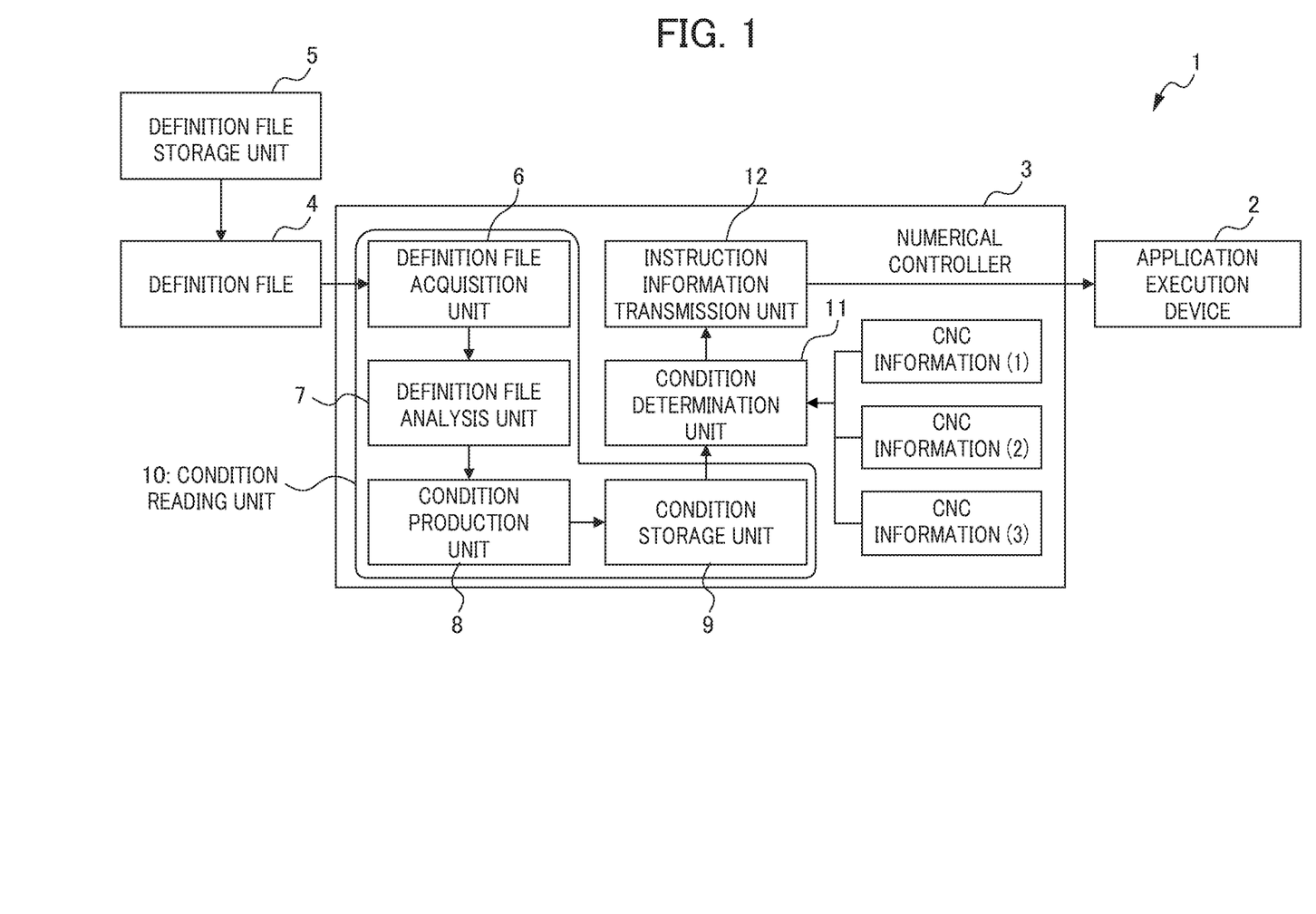
FIG. 1 is a block diagram showing one aspect of an application execution control system in the present disclosure.

For example, as shown in FIG. 1, the application execution control system 1 of the present embodiment includes: as application execution device 2; a CNC (computer numerical controller: Computerized Numerical Control) 3 of a controller which transmits, to the application execution device 2, operation instruction information in concert with an internal state; and a definition file storage unit 5 which stores a definition file 4 that defines the instruction information which is transmitted according to the information and the state of the CNC 3.

The CNC 3 of the present embodiment includes: a definition file acquisition unit 6 which acquires, based on the information of the CNC 3, the definition file 4 from the definition file storage unit 5; a definition file analysis unit 7 which analyzes the acquired definition file 4; a condition production unit 8 which produces, based on the result of the analysis, determination conditions of the information and the state of the CNC 3; and a condition storage unit 9 which stores the determination conditions produced with the condition production unit 8.

The definition file acquisition unit 6, the definition file analysis unit 7, the condition production unit 8 and the condition storage unit 9 constitute a condition reading unit 10.

The CNC 3 of the present embodiment includes: a condition determination unit 11 which performs a condition determination from various types of information of the CNC 3 based on the determination conditions acquired with the condition reading unit 10; and an instruction information transmission unit 12 which transmits the instruction information defined with the definition file 4 when the condition determination is performed and the information of the CNC 3 agrees with the determination conditions.

Then, in the application execution control system 1 of the present embodiment, the application execution device 2 executes processing with the instruction information transmitted from the instruction information transmission unit 12.

Here, the definition file 4 is an input means, and the format thereof is a text screen, an XML parameter or the like and does not particularly need to be limited.

In the application execution control system 1 of the present embodiment, an application designer stores, in the definition file storage unit 5, the information and the state of the CNC 3 and the definition file 4 which defines the instruction information to be transmitted.

When the definition file 4 is present in the definition file storage unit 5, the CNC 3 acquires and analyzes the definition file 4 in the condition reading unit 10 so as to produce determination conditions of the information and the state of the CNC 3 and stores, in the definition file storage unit 5, the determination conditions and the instruction information which is transmitted when agreeing with the conditions.

In the present embodiment, based on the determination conditions acquired in the condition reading unit 10, in the condition determination unit 11, the condition determination is periodically performed from various types of information of the CNC 3, and when the instruction information agrees with the determination conditions, the specified instruction information is transmitted from the instruction information transmission unit 12.

More specifically, with reference to FIGS. 2 (1), 3, 4 and 5, a method of controlling, in the control of a machine tool, the transmission of the instruction information (operation instruction information) to the application execution device 2 with the application execution control system 1 of the present embodiment will be described.

Figure 2:
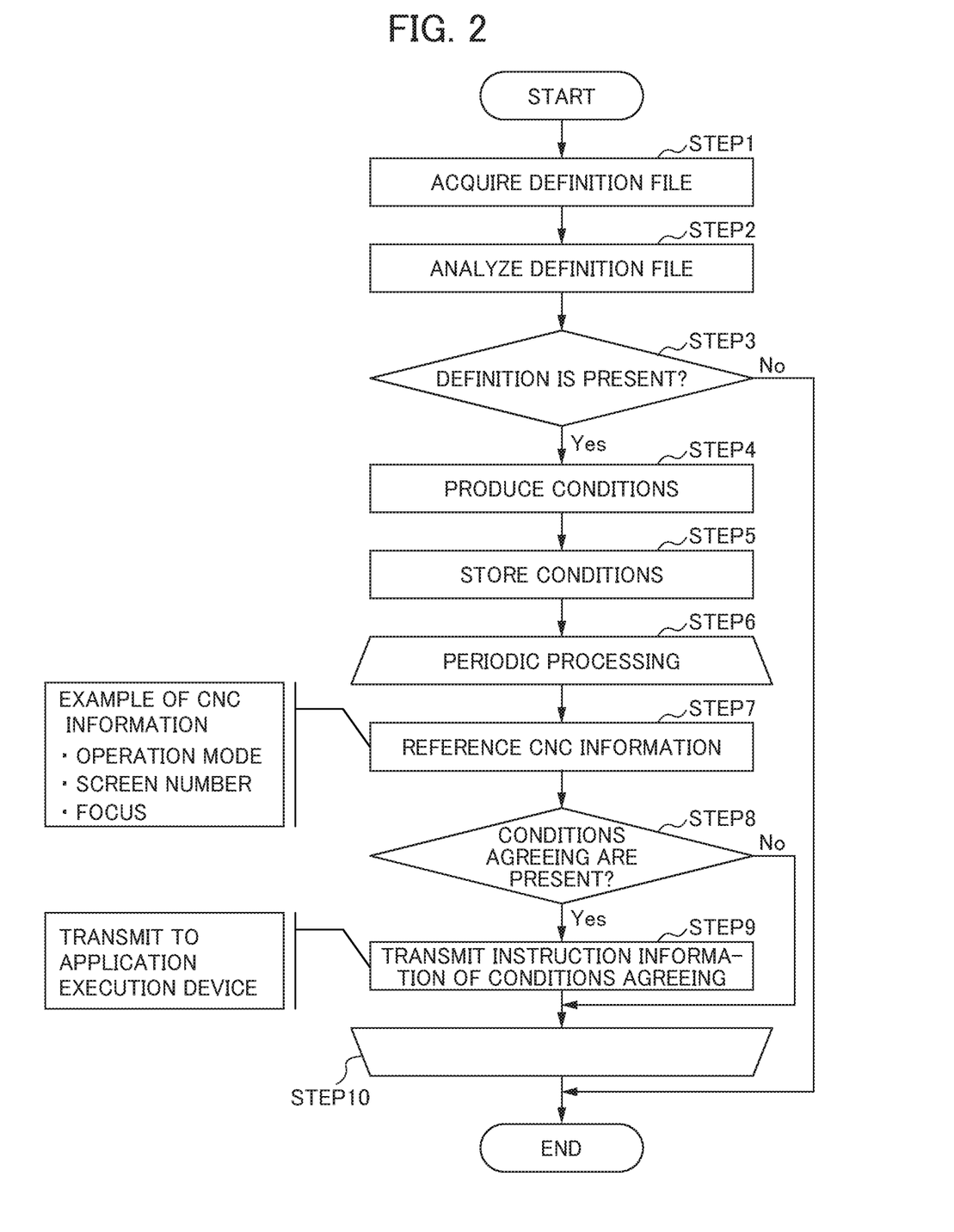
FIG. 2 is a flowchart showing a method and a procedure for controlling the transmission of instruction information to an application execution device in one aspect of the application execution control system in the present disclosure.

When the transmission of the instruction information to the application execution device 2 is controlled, as shown in FIG. 2, the definition file acquisition unit 6 acquires, from the definition file storage unit 5, the definition file 4 in which the instruction information that is transmitted according to the information and the state of the CNC 3 is defined (step 1).

EXAMPLE 1

Figure 3:
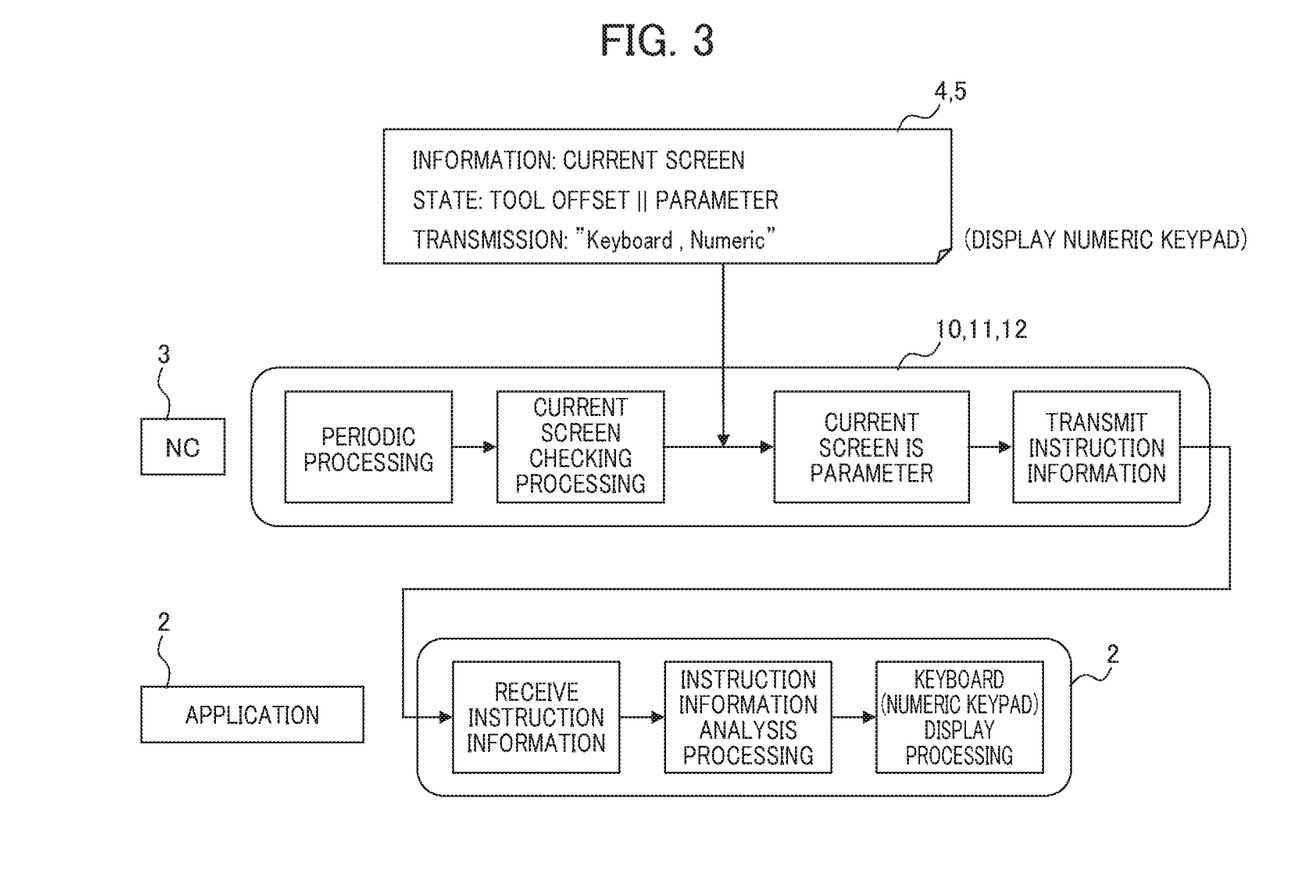
FIG. 3 is a diagram used in the description of example 1.

Here, when as shown in FIG. 3 (5), a current screen indicating the information and the state of the CNC 3 is a screen of a tool offset and a parameter, a numeric keypad is displayed on the screen, and the definition file 4 is defined such that the instruction information in the display of the numeric keypad is transmitted.

In the CNC 3, current screen checking processing is performed which checks the current screen with periodic processing that periodically performs the condition determination from various types of information of the CNC 3.

Specifically, in the periodic processing and the current screen checking processing, as shown in FIGS. 2 and 3 (5), the definition file acquisition unit 6 first acquires the definition file 4, and the definition file analysis unit 7 analyzes the acquired definition file 4 so as to check whether or not the definition is present (steps 2 and 3).

When the definition is not present, the transmission of the operation instruction information to the application execution device 2 is not performed, and the processing is completed.

When the definition is present, the condition production unit 8 produces, based on the result of the analysis, the determination conditions of the information and the state of the CNC 3 (step 4), and in the condition storage unit 9, the determination conditions and the instruction information which is transmitted when agreeing with the conditions are stored (step 5).

The condition determination unit 11 starts to periodically perform the periodic processing (step 6), for example, various types of information of the CNC 3 such as an operation mode, a screen number and a focus (a current screen parameter and the like) are referenced (step 7) and whether or not the conditions which agree with the determination conditions are present is checked (step 8).

When the determination conditions which agree therewith are not present, the transmission of the operation instruction information to the application execution device 2 is not performed, and the processing is completed.

When the determination conditions which agree therewith are present, the specified instruction information is transmitted from the instruction information transmission unit 12 (step 9), and the periodic processing is completed (step 10).

The application execution device 2 (application side) receives the instruction information transmitted from the instruction information transmission unit 12, performs analysis processing on the instruction information and performs keyboard (numeric keypad) display processing and the like.

EXAMPLE 2

An example where when an alarm is generated, the information of the generated alarm is searched with a manual for will then be described.

Figure 4:
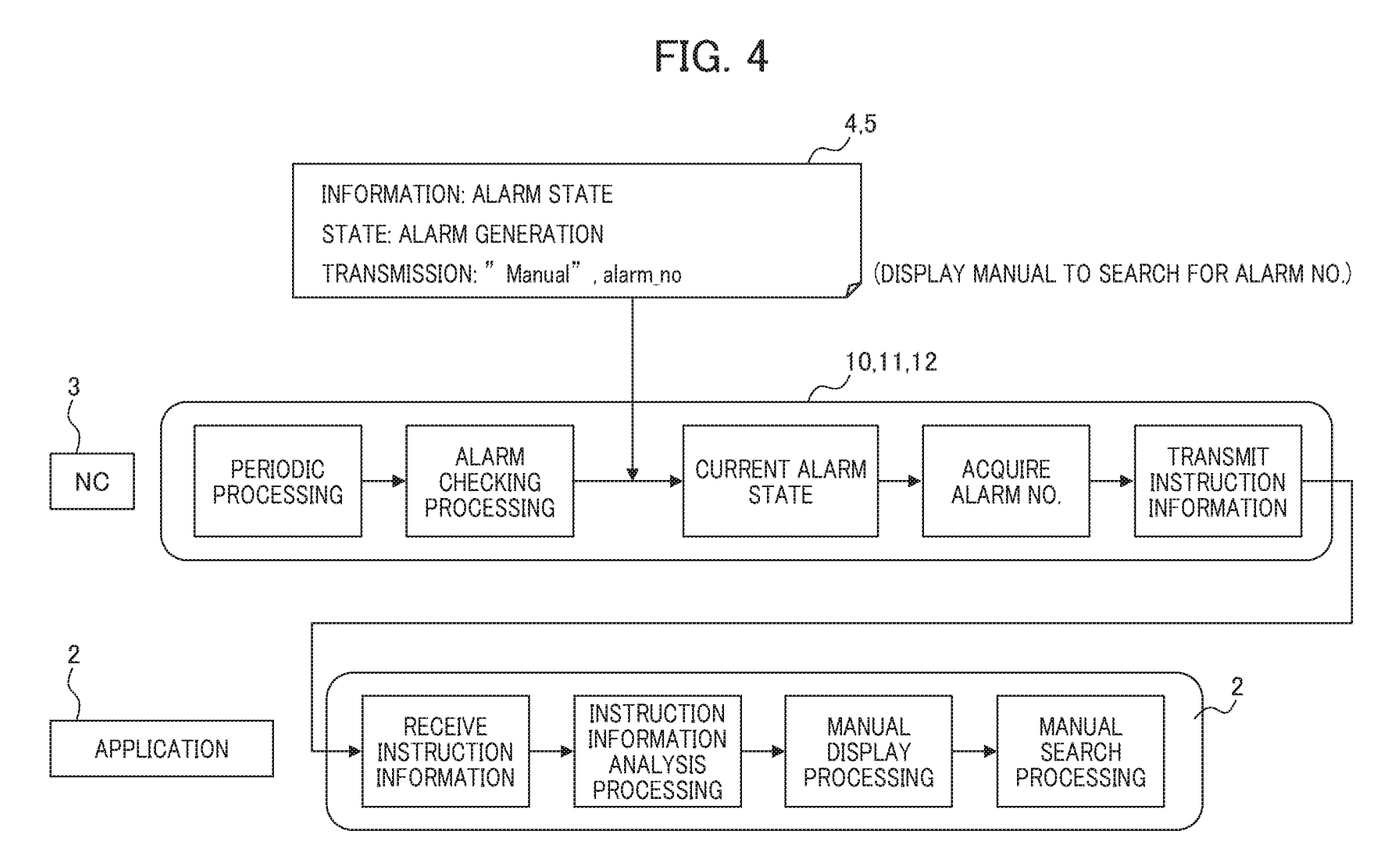
FIG. 4 is a diagram used in the description of example 2.
Figure 5:
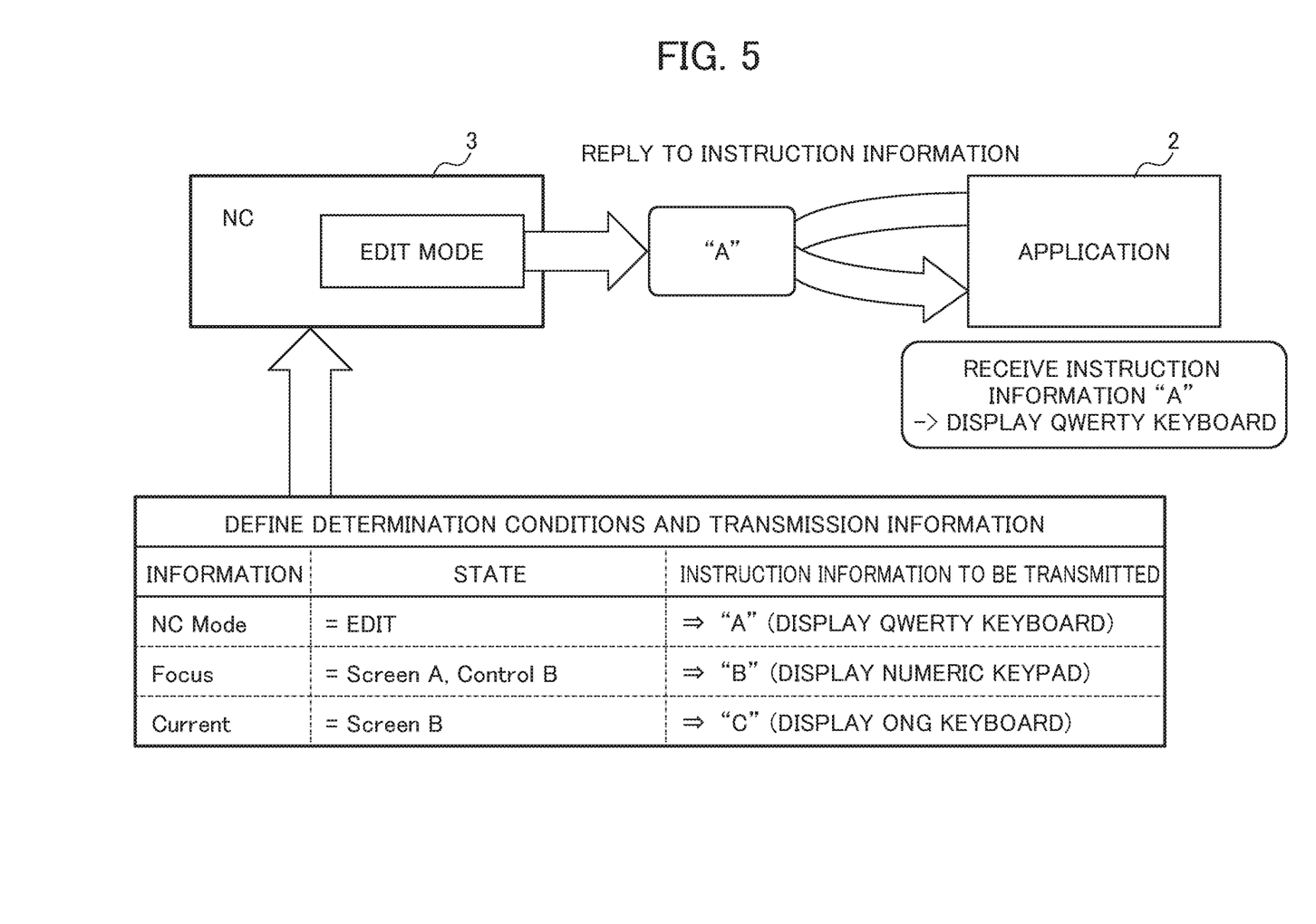
FIG. 5 is a diagram used in the description of examples 1 and 2.

When as shown in FIG. 4 (5), the current screen showing the information and the state of the CNC 3 is a screen of a tool offset, and a parameter, the definition file 4 is defined such that the instruction information of a manual display and the information of an alarm No. are transmitted.

In the CNC 3, alarm checking processing is performed which checks the alarm with the periodic processing that periodically performs the condition determination from various types of information of the CNC 3.

In the periodic processing and the alarm checking processing, as shown in FIGS. 2 and 4 (5), the definition file 4 is acquired, the acquired definition file 4 is analyzed and whether or not the definition is present is checked (steps 2 and 3).

When the definition is not present, the transmission of the operation instruction information to the application execution device 2 is not performed, and the processing is completed whereas when the definition is present, the determination conditions of the information and the state of the CNC 3 are produced based on the result of the analysis (step 4), and the determination conditions and the instruction information which is transmitted when agreeing with the conditions are stored in the condition storage unit 9 (step 5).

The condition determination unit 11 starts to periodically perform the periodic processing (step 6), the state of the alarm on the current screen is checked (step 7) and whether or not the conditions which agree with the determination conditions are present is checked (step 8).

When the determination conditions which agree therewith are not present, the transmission of the operation instruction information to the application execution device 2 is not performed, and the processing is completed.

When the determination conditions which agree therewith are present, that is, when the generation of the alarm is confirmed, the alarm No. is acquired, the specified instruction information is transmitted from the instruction information transmission unit 12 (step 9) and the periodic processing is completed (step 10).

The application execution device 2 (application side) receives the instruction information transmitted from the instruction information transmission unit 12, performs the analysis processing on the instruction information and performs manual display processing, manual search processing and the like.

Hence, in the application execution control system 1 of the present embodiment configured as described above, without the application monitoring all the information of the controller such as the CNC 3 which required, only the processing is performed in response to the issued instruction information, and thus it is possible to cooperate with the controller such as the CNC 3. In this way, it is possible to reduce a burden on the application and the number of development steps.

The determination conditions and the instruction information are previously prepared, and thus designs on the application side can be integrated (standardized), with the result that it is possible to remove a disadvantage in which a variation in the quality is produced as conventionally done.

Although the embodiment of the application execution control system has been described above, the present invention is not limited to the embodiment described above, and modifications are possible as necessary without departing from the spirit thereof.

For example, in the present embodiment, the description has been given with the assumption that the application execution control system is a control system using a CNC such as a machine tool of an industrial machine.

However, in the application execution control system, the controller does not need to be limited to a CNC, and the application execution control system may be a system using another controller such as a robot controller or a PLC (programmable logic controller).

In other words, the target which is controlled with the controller of the application execution control system is not limited to industrial machines such as a machine tool, a robot, a conveyor, a measuring device, a test device, a press machine, a press-fitting device, a printing machine, a die casting machine, an injection molding machine, a food machine, a packaging machine, a welding machine, a washing machine, a coating machine, an assembly device, a mounter, a woodworking machine, a sealing device and a cutting machine, and includes all devices such as an automatic warehouse, an elevator, an automatic door, a boiler and various types of attractions in a theme park in which automatic control is needed.

The application execution control system is applied to the control of all devices which need automatic control as described above, and thus it is possible to obtain the same operational effects as in the present embodiment.

A plurality of application execution devices 2 may be provided. In this case, a configuration may be adopted in which a relay application execution device is included, in which the instruction information transmitted from the instruction information transmission unit 12 is received in the relay application device and in which the relay application device transmits the instruction information to the application execution device 2 to which the instruction information needs to be transmitted. The relay application device as described above is included, and thus it is not necessary to select a destination to which the instruction information is transmitted from the instruction information transmission unit 12 on the side of the CNC 3. Without starting up the application execution device 2, it is possible to complete the processing which transmits the instruction information from the side of the CNC 3 (instruction information transmission unit 12).

EXPLANATION OF REFERENCE NUMERALS

1 application execution control system
2 application execution device
3 CNC (controller)
4 definition file
5 definition file storage unit
6 definition file acquisition unit
7 definition file analysis unit
8 condition production unit
9 condition storage unit
10 condition reading unit
11 condition determination unit
12 instruction information transmission unit

What is claimed is:
1. An application execution control system comprising:
a processor;
a controller that transmits operation instruction information in concert with an internal state to the processor; and
a storage that stores a definition file that defines the instruction information which is transmitted according to information and a state of the controller, the controller being configured to:
acquire the definition file;
analyze the acquired definition file;
produce, based on a result of the analysis, a determination condition of the information and the state of the controller;
store the produced determination condition;
perform a condition determination from various types of information of the controller based on the determination condition; and
transmit the instruction information defined with the definition file when the condition determination is performed and the information of the controller agrees with the determination condition,
wherein the processor executes processing with the transmitted instruction information.

2. The application execution control system according to claim 1, wherein the controller includes at least one of a CNC, a robot controller and a PLC which control an industrial machine.

* * * * *